July 1, 1924.  1,499,962
J. BARNES
PIPE JOINT
Filed Feb. 16, 1922
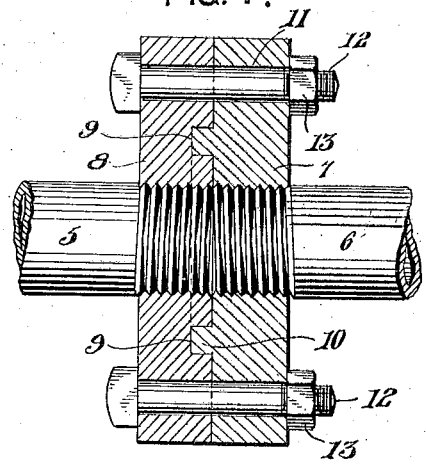
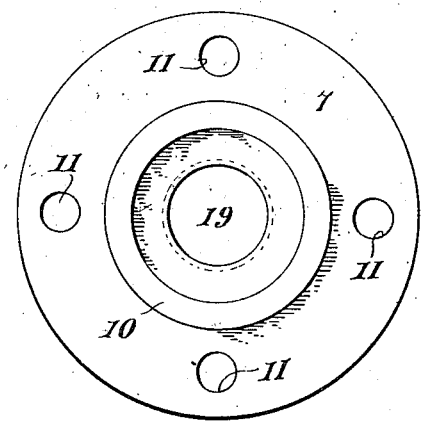
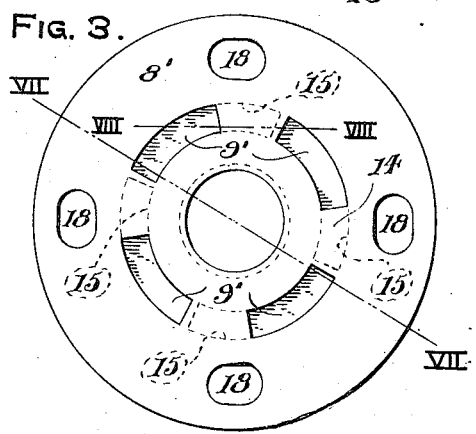
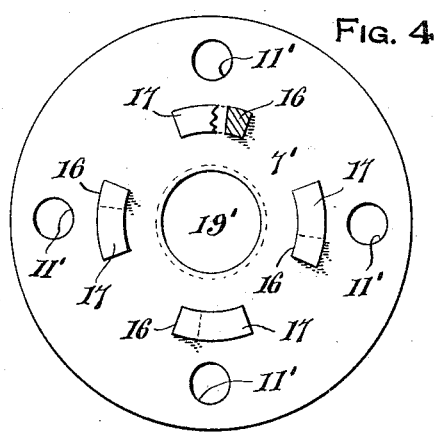
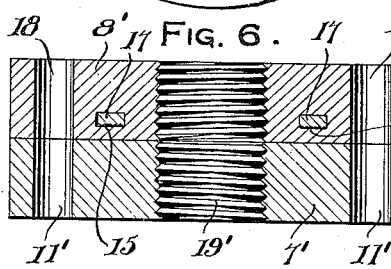
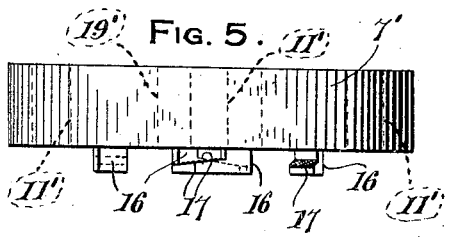
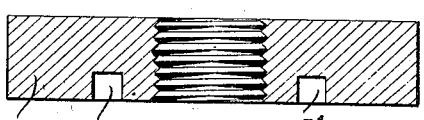
Inventor
J. Barnes
By F. N. Bryant,
Attorney Patented July 1, 1924.

1,499,962

UNITED STATES PATENT OFFICE.

JOHN BARNES, OF MANISTIQUE, MICHIGAN.

PIPE JOINT.

Application filed February 16, 1922. Serial No. 537,014.

*To all whom it may concern:*

Be it known that I, JOHN BARNES, a citizen of Czechoslovakia, residing at Manistique, in the county of Schoolcraft and State of Michigan, have invented certain new and useful Improvements in Pipe Joints, of which the following is a specification.

This invention relates to certain new and useful improvements in pipe joints, and has particular reference to the provision of a simple and efficient means for joining pipes in end to end abutting relation whereby no space is provided between the pipe ends for accumulation of sediment or dirt which is the principal cause of clogging of drain pipes or the like.

The primary object of the invention is to provide a pipe joint of the above character which will be simple in construction as well as durable and efficient in operation and capable of being readily installed without the necessity of skilled labor.

With the above general objects in view the invention consists of the novel combination and arrangement of parts hereinafter more fully described in connection with accompanying drawing, and in which like reference characters designate corresponding parts throughout the several views.

In the drawing:—

Figure 1 is a substantially central sectional view taken through a pipe joint constructed in accordance with the present invention;

Figure 2 is a face view of the male member of the joint shown in Figure 1;

Figure 3 is a view similar to Figure 2 of a modified form of female member;

Figure 4 is a view similar to Figure 3, partly broken away, of a male member adapted to be employed with the female member of Figure 3;

Figure 5 is an edge elevational view of the device shown in Figure 4;

Figure 6 is a view similar to Figure 1 with the pipes omitted showing the members of Figures 3 and 4 operatively connected;

Figure 7 is a central sectional view of the female member shown in Figure 3 taken upon line 7—7 of Figure 3, and Figure 8 is a fragmentary sectional view taken on line 8—8 of Figure 3.

Referring more in detail to the several views, and particularly to the form of the invention illustrated in Figures 1 and 2, the present invention aims to provide an efficient means for connecting two pipe sections 5 and 6 in abutting or contiguous end to end relation. In this form of the invention the pipes are connected by two disk like members one of which is indicated 7 and referred to as the male member of the joint, and the other of which is indicated at 8 and referred to as the female member of the joint. The disk members 7 and 8 are provided with central openings, the wall of which are threaded so that the threaded ends of the pipe sections 5 and 6 may be screwed thereinto with the end edges of said pipe sections lying flush with the inner faces of said members 7 and 8 so that when the members 7 and 8 are placed in contacting relation the end edges of the pipe sections will also abut or contact. The female member 8 is provided with an annular groove 9 concentric with and surrounding the central opening thereof adapted for snug reception of a similar formed annular rib 10 provided upon the inner face of the member 7 concentric with and surrounding the central opening of the latter. This interfitting of the disk members is provided to form a fluid tight joint, and it is obvious that any suitable form of packing may be placed at this point if found necessary. The disk members therefore consist of plates threaded on to the pipe ends and having inter-engaging members of circumferentially extending form which as shown in this form of the invention consists of annular groove and ribs. In order to effectively hold the disk in contacting relation and against relative rotation, said disks are provided with transverse openings 11 arranged in a circular series outwardly of the groove 9 and rib 10 and adapted for reception of bolts 12 which have nuts 13 threaded thereon so as to tightly bolt the disk members 7 and 8 together.

In the form of the invention illustrated in Figures 3 to 8 inclusive, the female member 8' is provided with a plurality of segmental grooves 9' which are segments of a similar circle and which are spaced by intermediate walls or ribs 14 which are undercut as at 15. The male member as adapted for use with the member of Figure 3 consists of a disk 7' having outstanding lugs threaded therewith as indicated at 16 and including angular portions 17 which extend circumferentially and which are of segmental form as well as spaced from the inner face of the disk 7'. The upper wall of each undercut portion 15 of the female member may be inclined or oblique as shown in Figure 8 and roughened, and the inner faces of the members 17 of the lugs 16 may be similarly formed so that when the disks are relatively rotated in the proper direction, the members 17 will be wedged into the undercut portions of the recesses 15 for effectively locking the disks together and against accidental relative rotation. In this form of the invention the male member is provided with bolt openings 11' adapted for reception of bolts in the same manner as has been described with respect to the form shown in Figures 1 and 2 and adapted to align with elongated openings 18 provided in the female member A', the elongation of the openings 18 permitting bolting of the disks 7' and 8' together should the interengaging parts 17 and 14 bind before the latter have been fully interengaged with each other to the complete rotation of one member to the other. The members 7' and 8' are provided with the usual central opening 19', the wall of which is threaded as described with respect to Figures 1 and 2, in which latter figures the opening is designated by the numeral 19. In this form of the invention the pipe sections are adapted to be threaded into the members 7' and 8' flush with the inner faces of the latter as above described and shown in Figure 1 with respect to the other form of the invention.

As the construction and manner of assembling the parts has been fully discussed above, it is believed that the construction and operation as well as the manner of use and advantages will be readily understood and appreciated by those skilled in the art.

Minor changes may be made without departing from the spirit and scope of the invention as herein claimed.

What is claimed as new is:—

In a pipe joint of the class described, male and female members having axial internally threaded registering bores, the contacting face of the female member having a circular series of spaced arcuate depressions therein defining spaced ribs, and each rib having a portion thereof undercut at corresponding ends communicating with the depression and roughened on the inner face thereof, the contacting face of the male member being provided with a circular series of spaced lugs, an arcuate extension carried by the outer end of each lug projecting in the same direction and in directions opposite to the spaced ribs, and adapted to be received in the depressions of the female member with the extensions projecting into the undercut portions beneath the ribs and engaging the same with the faces of the male and female members flatly engaging each other, the interlocking connections between the members being confined within the external configuration thereof, and means for preventing relative rotary movement of the members.

In testimony whereof I affix my signature.

JOHN BARNES.